United States Patent [19]
Kato et al.

[11] Patent Number: 5,726,782
[45] Date of Patent: Mar. 10, 1998

[54] HOLOGRAM AND METHOD OF FABRICATING

[75] Inventors: Tetsuya Kato, Okazaki; Toshiki Saburi, Inazawa; Naoyuki Kawazoe, Yokkaichi; Yasuhiro Mizutani, Mie-ken, all of Japan

[73] Assignee: Nippondenso Co., Ltd., Kariya, Japan

[21] Appl. No.: 620,743

[22] Filed: Mar. 18, 1996

Related U.S. Application Data

[63] Continuation of Ser. No. 305,511, Sep. 13, 1994, abandoned, which is a continuation-in-part of Ser. No. 196,381, Feb. 15, 1994, Pat. No. 5,604,611, which is a division of Ser. No. 958,262, Oct. 9, 1992, Pat. No. 5,313,317.

[30] Foreign Application Priority Data

Oct. 9, 1991 [JP] Japan ........................ 3-262008
Sep. 14, 1993 [JP] Japan ........................ 5-252626

[51] Int. Cl.$^6$ ............... G03H 1/02; G03H 1/18; G02B 27/01; G02B 27/00
[52] U.S. Cl. ............... 359/3; 359/13; 359/576; 359/601
[58] Field of Search ............... 359/3, 13, 14, 359/15, 30, 590, 572, 576, 601

[56] References Cited

U.S. PATENT DOCUMENTS

| | | | |
|---|---|---|---|
| 3,586,412 | 6/1971 | Leith | 359/19 |
| 4,367,911 | 1/1983 | Graube | 359/3 |
| 4,374,158 | 2/1983 | Taniguchi et al. | 427/536 |
| 4,732,454 | 3/1988 | Saito et al. | 359/590 |
| 4,747,674 | 5/1988 | Butterfield et al. | 359/590 |
| 4,816,333 | 3/1989 | Lange et al. | 428/331 |
| 4,953,923 | 9/1990 | Wreede | 359/3 |
| 5,066,525 | 11/1991 | Nakamachi et al. | 359/13 |
| 5,105,287 | 4/1992 | Moss et al. | 359/3 |
| 5,164,847 | 11/1992 | McCartney et al. | 359/30 |
| 5,330,264 | 7/1994 | Ando et al. | 359/30 |

FOREIGN PATENT DOCUMENTS 62-80687  4/1987  Japan.

*Primary Examiner*—Jon W. Henry
*Attorney, Agent, or Firm*—Cushman, Darby & Cushman IP Group of Pillsbury, Madison & Sutro LLP

[57] ABSTRACT

A hologram element includes an optically transparent base plate having first and second opposite surfaces. A film of a diffraction grating is provided on the first surface of the base plate. A nonreflective member is provided on the second surface of the base plate via a dipping process. The nonreflective member includes one of a film including $SiO_2$ particles and a film of $MgF_2$. It is preferable that the $SiO_2$ particles have diameters of 10–150 nm. The diffraction grating film includes, for example, one of a gelatine film, a photopolymer film, and a photoresist film. The base plate includes, for example, a flexible resin film. It is preferable that the flexible resin film is made of a material selected from the group consisting of amorphous polyolefine, polycarbonate (PC), polymethyl methacrylate (PMMA), and perfluoroalkoxypolyethylene (PFA).

67 Claims, 10 Drawing Sheets

HOLOGRAM AND METHOD OF FABRICATING

CROSS-REFERENCES TO RELATED APPLICATIONS

This is a continuation of application Ser. No. 08/305,511, filed on Sep. 13, 1994 now abandoned, which is a continuation-in-part of United States patent application, Ser. No. 08/196,381, filed on Feb. 15, 1994 now issued as U. S. Pat. No. 5,604,611 which is a division of United States patent application, Ser. No. 07/958,262, filed on Oct. 9, 1992 now issued as U. S. Pat. No. 5,313,317.

BACKGROUND OF THE INVENTION

1. Field of the Invention

This invention relates to a hologram usable in various devices such as a head-up display.

2. Description of the Prior Art

Systems commonly used in aircraft to display images of instruments in the field of view of a pilot are termed "head-up displays". Some of the head-up displays employ holograms to project a virtual image of an instrument into the pilot's field of view as the pilot looks through the forward window of the aircraft.

Also, holographic head-up displays for automotive vehicles have been developed.

It is desirable that holograms used in head-up displays generate an acceptably low level of noise or ghost.

Japanese published unexamined patent application 62-80687 discloses the fabrication of a hologram in which an antireflection film is formed on a photosensitive film of a hologram-forming base plate (substrate). During a light exposure step in the fabrication of a hologram, the antireflection film decreases reflection of reference light at the boundary between air and the photosensitive film so that spurious hologram recordings are reduced. The reduction of spurious hologram recordings enables a decrease in the level of noise or ghost when an image is reproduced or indicated by using the resultant hologram.

In general, advanced holograms have complicated structures. The complicated structures, however, tend to cause noise during image reproduction.

SUMMARY OF THE INVENTION

It is an object of this invention to provide an improved hologram.

A first aspect of this invention provides a hologram element comprising an optically transparent base plate having first and second opposite surfaces; a film of a diffraction grating which is provided on the first surface of the base plate; and means provided on the second surface of the base plate for preventing reflection of light; wherein said means comprises one of a film including $SiO_2$ particles and a film of $MgF_2$.

It is preferable that the $SiO_2$ particles have diameters of 10–150 nm. It is also preferable that the diffraction grating film comprises one of a gelatine film, a photopolymer film, and a photoresist film. The base plate comprises, for example, a flexible resin film.

It is preferable that the flexible resin film is made of a material selected from the group consisting of amorphous polyolefine, polycarbonate (PC), polymethyl methacrylate (PMMA), and perfluoroalkoxypolyethylene (PFA).

The hologram element of claim 1 may be attached to a vehicle windshield when being used.

A second aspect of this invention provides a hologram display comprising a cover plate: and a hologram element provided on the cover plate and having a side subjected to incident light; wherein said hologram element comprises a flexible resin film, a film of a diffraction grating which is provided on the flexible resin film, and means provided at said side of the hologram element for preventing reflection of light, said means comprising one of a film including $SiO_2$ particles and a film of $MgF_2$.

It is preferable that the diffraction grating film comprises one of a gelatine film, a photopolymer film, and a photoresist film. It is also preferable that the flexible resin film is made of a material selected from the group consisting of amorphous polyolefine, polycarbonate (PC), polymethyl methacrylate (PMMA), and perfluoroalkoxypolyethylene (PFA).

The $SiO_2$ particles have diameters of, for example, 10–150 nm. The hologram element may be sandwiched between two cover plates. Edges of the cover plate and the flexible resin film may be bonded together by ultrasonic welding.

A third aspect of this invention provides a hologram element comprising an optically transparent base plate having first and second opposite surfaces; a film of a diffraction grating which is provided on the first surface of the base plate; an optically transparent member having first and second opposite surfaces, wherein the first surface of the member faces the diffraction grating film; and means provided on the second surface of the base plate for preventing reflection of light; wherein said means comprises one of a film including $SiO_2$ particles and a film of $MgF_2$, and said $SiO_2$ particles have diameters of 10–150 nm, and wherein at least one of the base plate and the member comprises a flexible resin film.

In this invention, "optically transparent" means both "fully transparent" and "semitransparent". In a special case, "optically transparent" means "opaque".

DESCRIPTION OF A FIRST GROUP OF THE PREFERRED EMBODIMENTS

Figure 1:
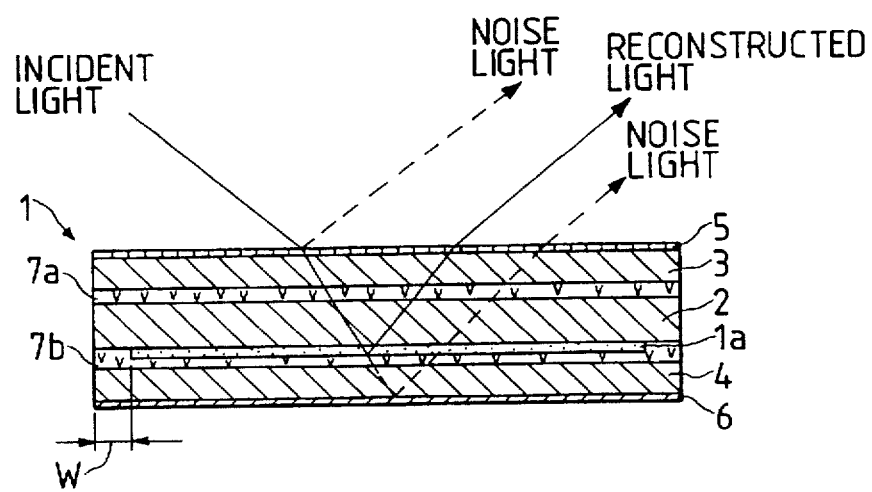
FIG. 1 is a sectional view of a hologram according to an embodiment of this invention.
Figure 2:
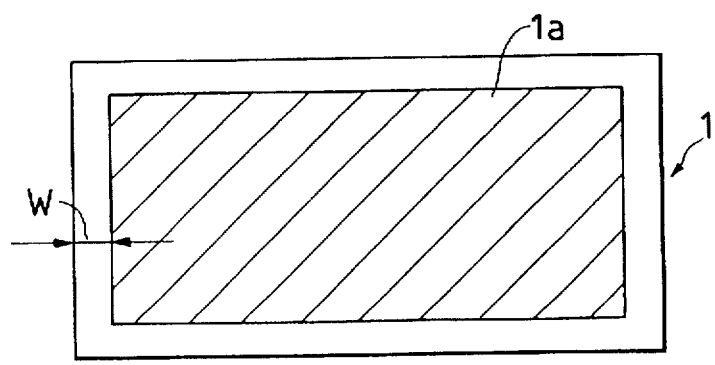
FIG. 2 is a plan view of the hologram of FIG. 1.

With reference to FIGS. 1 and 2, a hologram 1 includes a transparent base plate (substrate) 2 made of glass and having, for example, a rectangular shape. The base plate 2 has a predetermined uniform thickness. The base plate 2 has opposite larger surfaces, that is, upper and lower surfaces in FIG. 1.

In FIG. 1, a given area of the lower surface of the base plate 2 except edges thereof is provided or coated with a film of a hologram element 1 a which has a predetermined uniform thickness and which has a rectangular shape similar to, but smaller than, the shape of the base plate 2. The hologram element 1a holds a predetermined pattern or a predetermined recorded medium. During the fabrication of the hologram 1, by exposing photosensitive material used to form hologram element 1a, to light, the predetermined pattern (the recorded medium) provided by interference fringes are recorded on the photosensitive material. As will be described later, the recorded medium corresponds to a convex or concave lens serving as a magnifying lens.

Interference fringes having a pitch of 290 nm and interference fringes having a pitch of 320 nm are recorded on the hologram element 1a. These recordings are executed by changing a direction or angle of a laser light beam being incident to the photosensitive material and forming the interference fringes. The interference fringes are of two different shape types having predetermined curvatures to simultaneously record information regarding the convex or concave lens and information regarding color.

In FIG. 1, a transparent cover plate 3 made of glass extends above the base plate 2. The cover plate 3 has a rectangular shape equal to the shape of the base plate 2 and is aligned with the base plate 2. The cover plate 3 has a predetermined uniform thickness. The cover plate 3 has opposite larger surfaces, that is, upper and lower surfaces in FIG. 1. In FIG. 1, the entire area of the upper surface of the cover plate 3 is coated with an antireflection film 5 having a predetermined uniform thickness. The antireflection film 5 is exposed to atmosphere.

In FIG. 1, a transparent cover plate 4 made of glass extends below the base plate 2. The cover plate 4 has a rectangular shape equal to the shape of the base plate 2 and is aligned with the base plate 2. The cover plate 4 has a predetermined uniform thickness. The cover plate 4 has opposite larger surfaces, that is, upper and lower surfaces in FIG. 1. In FIG. 1, the entire area of the lower surface of the cover plate 4 is coated with an anti-scattering film 6 having a predetermined uniform thickness. The anti-scattering film 6 is exposed to atmosphere.

A layer 7a of transparent sealing material which has a predetermined uniform thickness is provided between the base plate 2 and the cover plate 3. A layer 7b of transparent sealing material is provided between the hologram element 1a and the cover plate 4, and between the edges of the base plate 2 and the cover plate 4. The hologram element 1a is isolated from atmosphere by the sealing layer 7b so that it is protected from moisture of atmosphere. In FIGS. 1 and 2, portions of the sealing layer 7b which effect the isolation of the hologram element 1a from atmosphere have a predetermined width (sealing width) "W".

In operation of the hologram 1 of FIG. 1, a beam of incident light enters the hologram 1 via the antireflection film 5. Specifically, the incident light beam successively passes through the antireflection film 5, the cover plate 3, the sealing layer 7a, and the base plate 2, and then reaches the hologram element 1a. The incident light beam is diffracted and reflected by the predetermined pattern on the hologram element 1a, being converted into a diffraction-resultant light beam or a reconstructed light beam. The reconstructed light beam moves back through the base plate 2, the sealing layer 7a, the cover plate 3, and the antireflection film 5. The reconstructed light beam exits from the hologram 1.

Figure 3:
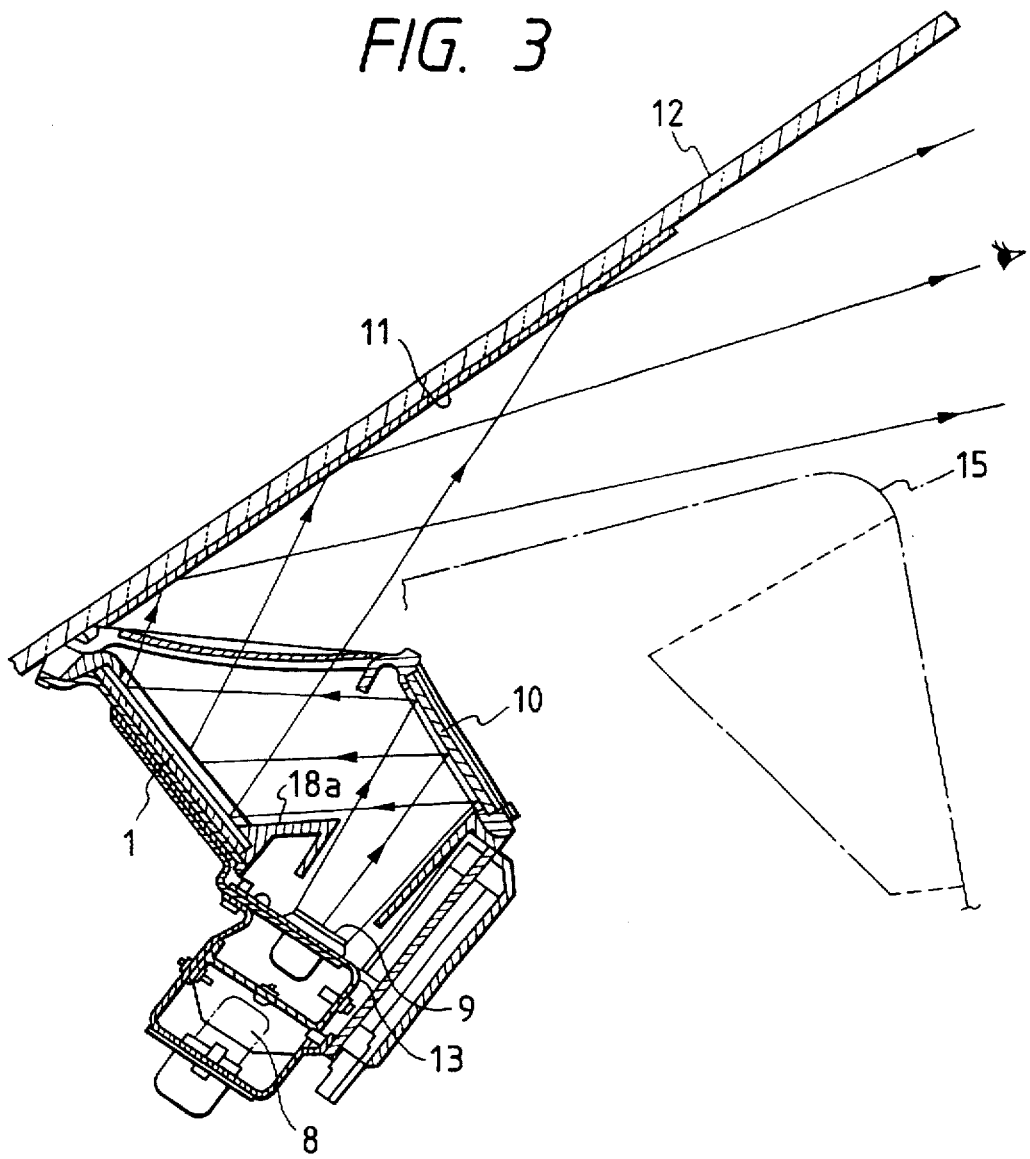
FIG. 3 is a sectional view of an automotive head-up display using the hologram of FIGS. 1 and 2.
Figure 4:
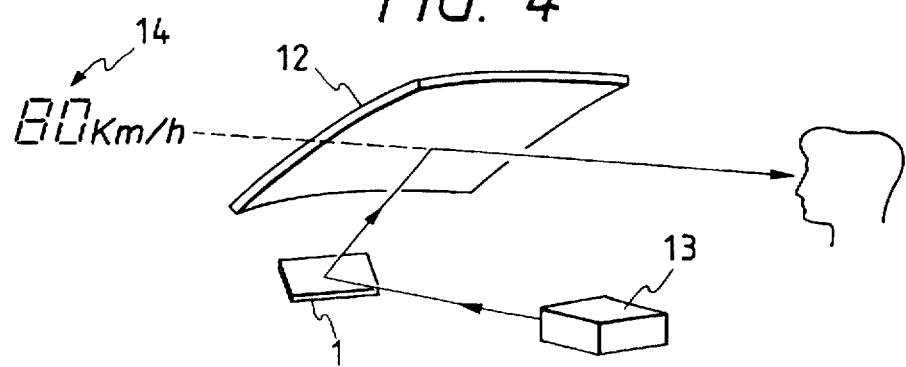
FIG. 4 is a perspective diagram of the automotive head-up display of FIG. 3.

As shown in FIGS. 3 and 4, the hologram 1 of FIGS. 1 and 2 can be used in a head-up display for an automotive vehicle. Specifically, the head-up display includes an indicator frame 13 on which an incandescent light 8, a liquid crystal panel 9, a mirror 10, and the hologram 1 are supported. The liquid crystal panel 9 is located in front of the incandescent light 8. The liquid crystal panel 9 functions to indicate information of a vehicle speed, master warning, a direction, a map, and others. In general, the indicator assembly 13 is located near a vehicle instrument panel 15.

The head-up display of FIGS. 3 and 4 operates as follows. A light beam emitted from the incandescent light 8 passes through the liquid crystal panel 9, and then reaches the mirror 10. While the light beam passes through the liquid crystal panel 9, it carries information indicated by the liquid crystal panel 9. The light beam is reflected by the mirror 10, and then reaches the hologram 1. The light beam is diffracted and reflected by the hologram 1, being converted into a reconstructed light beam. The reconstructed light beam exits from the hologram element 1, and then reaches a film 11 on a vehicle windshield 12. The formation of the film 11 on the vehicle windshield is based on a vapor deposition process. The reconstructed light beam is reflected by the film 11 on the windshield 12 toward driver's eyes. Thus, a virtual image 14 of the information indicated by the liquid crystal panel 9 is projected into the driver's field of view as the driver looks through the windshield 12.

The antireflection film 5 prevents the incident light beam from being reflected at a boundary between the antireflection film 5 and atmosphere. The antireflection film 5 may be designed so as to prevent the incident light beam, which has been reflected at a boundary between the second surface of the base plate and atmosphere, from travelling in a direction equal to a direction of travel of the reconstructed light generated via the hologram element. Thus, the antireflection film 5 reduces noise or ghost light. The anti-scattering film 6 prevents the light beam, which has successively passed through the base plate 2, the hologram element 1a, and the cover plate 4 and has then been reflected at a boundary between the lower surface of the cover plate 4 and atmosphere, from travelling back to the hologram element 1a. Thus, the anti-scattering film 6 reduces noise or ghost light.

Figure 8:
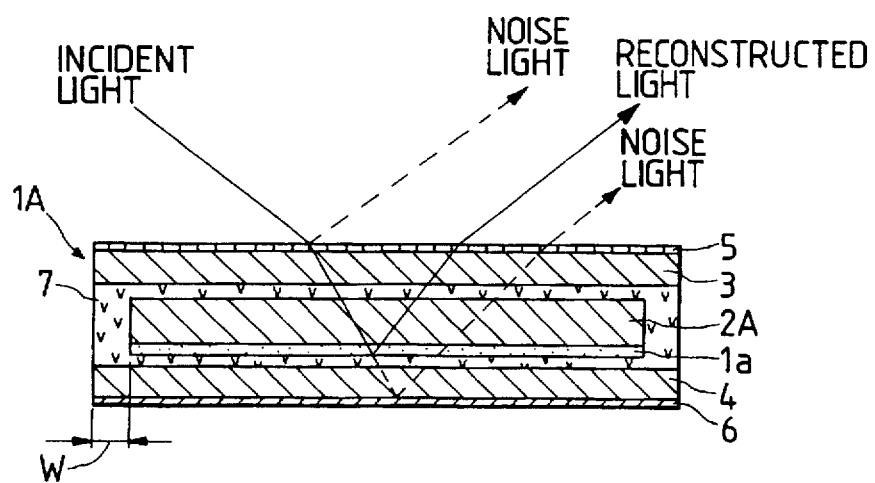
FIG. 8 is a sectional view of a first modified hologram according to an embodiment of this invention.

FIG. 8 shows a first modified hologram 1A which is similar to the hologram 1 of FIGS. 1 and 2 except for design changes described hereinafter. The hologram 1A includes a base plate 2A, the size of which is reduced in comparison with the size of the base plate 2 of FIGS. 1 and 2 by a value corresponding to the sealing layer width "W". In FIG. 8, the entire area of the lower surface of the base plate 2A contacts a hologram element 1a. The combination of the base plate 2A and the hologram element 1a are completely surrounded by sealing material 7.

Figure 10:
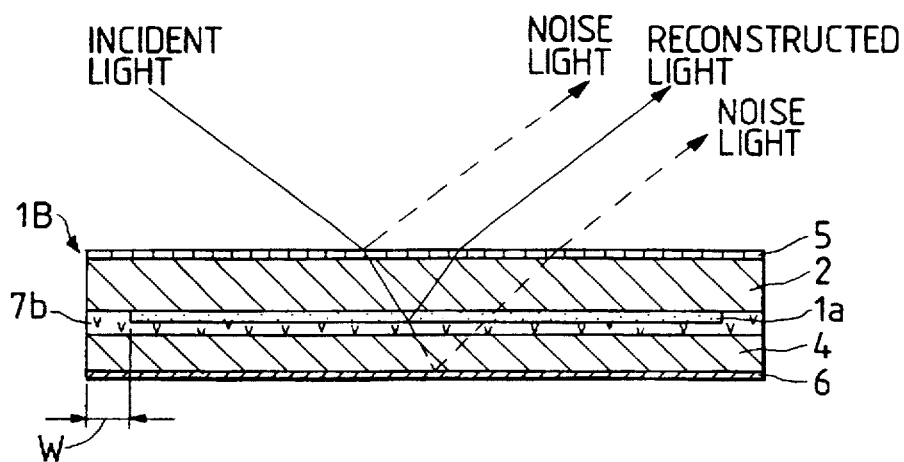
FIG. 10 is a sectional view of a second modified hologram according to an embodiment of this invention.

FIG. 10 shows a second modified hologram 1B which is similar to the hologram 1 of FIGS. 1 and 2 except for design changes described hereinafter. In the hologram 1B of FIG. 10, the cover plate 3 and the sealing layer 7a (see FIG. 1) are omitted. The hologram 1B of FIG. 10 includes a base plate 2, the upper surface of which is coated with an antireflection film 5.

Figure 11:
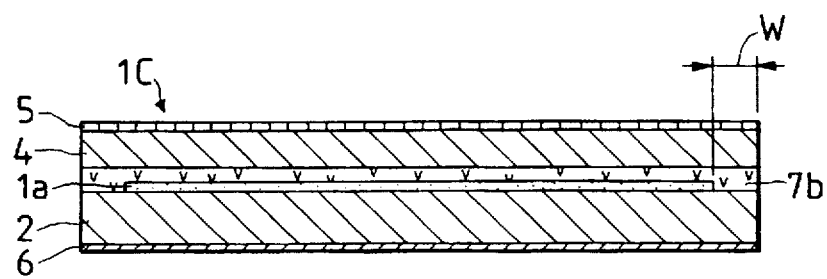
FIG. 11 is a sectional view of a third modified hologram according to an embodiment of this invention.

FIG. 11 shows a third modified hologram 1C which is similar to the hologram 1B of FIG. 10 except for design changes described hereinafter. The hologram 1C of FIG. 11 is inverted with respect to the hologram 1B of FIG. 10. In the hologram 1C of FIG. 11, the surface of a base plate 2 which is remote from a hologram element 1a is coated with an anti-scattering film 6, and the surface of a cover plate 4 which is remote from the hologram element 1a is coated with an antireflection film 5.

Figure 5:
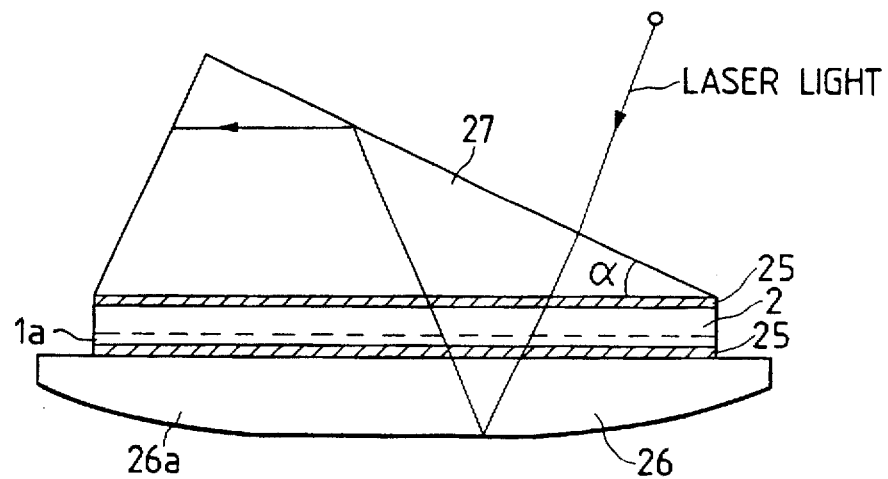
FIG. 5 is a sectional view of an optical arrangement used in the fabrication of the hologram of FIGS. 1 and 2.

The hologram of FIGS. 1 and 2 was fabricated as follows. First, as shown in FIG. 5, a transparent base plate 2 made of glass was prepared, and a layer 1a of photosensitive material was formed on one surface of the base plate 2. The photosensitive material used dichromated gelatin (D. C. G). The photosensitive layer 1a had a thickness of 10 μm to 40 μm. After the photosensitive layer 1a was subjected to gelation or was dried, it was stabilized within atmosphere having a temperature of 20° C. and a relative humidity (RH) of 50%. Then, a predetermined pattern corresponding to a magnifying lens (a convex or concave lens) was recorded on the photosensitive layer 1a. The photosensitive layer 1a was successively subjected to a development process and a drying process so that the photosensitive layer 1a was made into a hologram element. A transparent cover plate 3, one surface of which was coated with an antireflection film 5, was prepared. In addition, a transparent cover plate 4, one surface of which was coated with an anti-scattering film 6, was prepared. Subsequently, as shown in FIG. 1, the base plate 2 with the hologram element 1a was placed between the cover plates 3 and 4 while a sealing layer 7a including adhesive was prodded between the base plate 2 and the cover plate 3 and a sealing layer 7b including adhesive was prodded between the cover plate 4 and the base plate 2 with the hologram element 1a. The cover plate 3 with the antireflection film 5, the base plate 2 with the hologram element 1a, and the cover plate 4 with the anti-scattering film 6 were bonded together by the sealing layers 7a and 7b.

Specifically, the recording of the predetermined pattern on the photosensitive layer 1a was executed as follows. As shown in FIG. 5, the base plate 2 with the photosensitive layer 1a was placed between a lens 26 and a prism 27. The lens 26 was a recorded medium. In other words, the predetermined pattern recorded on the photosensitive layer 1a corresponded to the lens 26. The lens 26 had a flat surface which faced the photosensitive layer 1a on the base plate 2. The surface of the base plate 2 which was remote from the photosensitive layer 1a faced a flat bottom surface of the prism 27. The lens 26 and the prism 27 had refractive indexes which were approximately equal to the refractive index of the base plate 2. The lens 26 had a predetermined focal length. Silicone oil 25 was provided between the base plate 2 with the photosensitive layer 1a and the lens 26, and between the base plate 2 and the prism 27. The silicone oil 25 served as refractive index matching liquid. An argon laser light beam having a wavelength of 514.5 nm was applied to an input surface of the prism 27. After the light beam entered the prism 27 via its input surface, the light beam successively passed through the prism 27, the silicone oil 25, the base plate 2, the photosensitive layer 1a, the silicone oil 25, and the lens 26. Since the combination of the prism 27, the silicone oil 25, the base plate 2, the photosensitive layer 1a, the silicone oil 25, and the lens 26 had an essentially uniform refractive index, the light beam travelled along a substantially straight path. The light beam was reflected by a reflecting film (not shown) formed on a surface of the lens 26 which was remote from the photosensitive layer 1a. The reflected light beam travelled back through the lens 26 and the silicone oil 25, and then entered the photosensitive layer 1a. In the photosensitive layer 1a, the forward light beam (incoming light beam) and the reflected light beam (return light beam) interfered with each other so that they formed interference fringes corresponding to a predetermined pattern determined by the lens 26. The predetermined pattern corresponding to the interference fringes were recorded on the photosensitive layer 1a.

A portion of the reflected light beam was reflected by the surface of the base plate 2 while another portion of the reflected light beam entered the base plate 2 and then travelled through the base plate 2 and the silicone oil 25. After the light beam travelled through the silicone oil 25, it entered the prism 27 and then reached the input surface thereof. A portion of the light beam was reflected at the input surface of the prism 27. The angle a between the input surface and the bottom surface of the prism 27 was chosen so that the light beam reflected at the input surface did not return toward the photosensitive layer 1a. Thus, noise or spurious hologram recordings were eliminated. The angle α was preferably equal to 30°. For further elimination of noise or spurious hologram recordings, it was preferable that a black paint was applied to a non-input surface (the left-hand surface in FIG. 5) of the prism 27 to prevent the light beam, which was reflected at the input surface, from being reflected again by the non-input surface toward the photosensitive layer 1a.

Since the base plate 2 and the prism 27 had essentially the same refractive index, the reflected light beam travelled from the base plate 2 to the prism 27 via the silicone oil 25 without being reflected toward the photosensitive layer 1a at the surface of the base plate 2 which was close to the prism 27. Thus, in this regard, noise or spurious hologram recordings were eliminated also.

FIRST EXAMPLE

A transparent base plate made of soda glass was prepared. The base plate had a refractive index of about 1.52. The base plate had a size of 112 mm×46 mm×1.8 mm. A layer of dichromated gelatin (D. C. G), that is, photosensitive material, was formed on one surface of the base plate. The photosensitive layer had a thickness of 25 μm. The photosensitive material was made by dissolving 0.2 g (gram) of ammonium dichromate in 100 ml of 4% gelatine solution.

The photosensitive material had a refractive index of about 1.53. The base plate with the photosensitive layer was placed in a drier for 72 hours. The drier was filled with atmosphere having a temperature of 20° C. and a relative humidity (RH) of 50%. Then, by using the optical arrangement of FIG. 5, a predetermined pattern corresponding to a magnifying lens (a convex or concave lens) 26 was recorded on the photosensitive layer in a light exposure process. Specifically, the photosensitive layer was exposed to an argon laser light beam with a wavelength of 514.5 nm while the incident angle of the light beam was changed between two predetermined angles. This change of the incident angle of the light beam was designed so that, during practical use of a resultant hologram, reconstructed light beams of two different colors or wavelengths (for example, 540 nm and 600 nm in the case of an incident angle of 33.5°) could be generated. The total power of the laser light beam applied to the photosensitive layer was 500 mJ. The focal length of the lens 26 in the light exposure arrangement of FIG. 5 was 1,000 mm. After the light exposure process, the base plate with the photosensitive layer was washed in water until the color thereof was lost. Then, the base plate with the photosensitive layer was dipped in commercially-available photography hardening fixer (for example, "Rapid Fixer" produced by Eastman Kodak Company) for 10 minutes. The base plate with the photosensitive layer was washed in water again, and was then dipped in a 90% isopropanol solution for 10 minutes. The base plate with the photosensitive layer was dried by hot air. Then, the base plate with the photosensitive layer was subjected to a thermally-ageing process to prevent a change of characteristics of the predetermined pattern on the photosensitive layer during practical use of the hologram. Specifically, the base plate with the photosensitive layer was heated at 150° C. for 4 hours. To provide a 5-mm sealing layer width "W" of FIGS. 1 and 2, edges of the photosensitive layer were removed. In this way, the photosensitive layer was made into a hologram element.

A first cover plate having a size of 112 mm×46 mm×1.0 mm was prepared. The first cover plate had a 4-layer laminated structure in which of $MgF_2$ layers and $TiO_2$ layers alternated with each other. An antireflection film was formed on one surface of the first cover plate. The antireflection film had a luminous reflectance of 0.3%. Similarly, a second cover plate having a size of 112 mm×46 mm×1.0 mm was prepared. An anti-scattering film having a thickness of 10 µm was formed on one surface of the second cover plate. The anti-scattering film was made by adding black pigment to epoxy resin at a weight ratio of 5% and mixing the black pigment and the epoxy resin. The black pigment used, for example, "Glass Lite 500" produced by a Japanese Company, Kashuu Kabushiki-Kaisha. Sealing material having a refractive index of 1.55 was applied to the other surfaces of the first and second cover plates respectively so that layers of the sealing material were formed thereon. The sealing layers had a thickness of 50 µm. The sealing material was made of epoxy thermosetting resin (for example, "CS-2340-5" produced by Cemedine Company). The base plate with the hologram element was placed between the first and second cover plates as shown in FIG. 1, and they were bonded together by the sealing layers.

The previously-mentioned luminous reflectance (Y%) was calculated by referring to the following equation.

$$Y\% = 100 \int_{400}^{750} S(\lambda)R(\lambda)y(\lambda)d\lambda / \int_{400}^{750} y(\lambda)d\lambda$$

where λ denoted a light wavelength changed at pitches of 10 nm; S(λ) denoted a flat light source and thus S(λ)=1; R(λ) denoted a spectral reflection spectrum; and y(λ) denoted a color matching function of 1931CIE.

SECOND EXAMPLE

Figure 9:
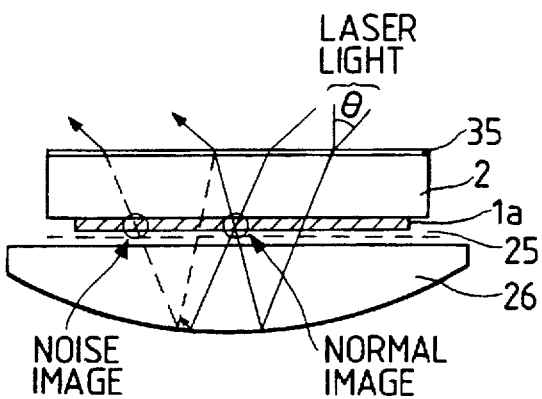
FIG. 9 is a sectional view of an optical arrangement used in the fabrication of a hologram.

A second example was similar to the first example except for a method of executing hologram recordings on a photosensitive layer. Specifically, as shown in FIG. 9, a surface of a base plate 2 which was remote from a photosensitive layer 1a was coated with an antireflection film 35. A lens 26 was placed in a manner such as to face the photosensitive layer 1a on the base plate 2. Silicone oil 25 serving as refractive index matching liquid was provided between the photosensitive layer 1a and the lens 26. An argon laser light beam was applied to the photosensitive layer 1a via the antireflection film 35 and the base plate 2. The incident angle θ of the light beam was set to 20° and 39°. In other words, the incident angle θ of the light beam was changed between 20° and 39°.

THIRD EXAMPLE

A third example was similar to the first example except that an antireflection film was not formed.

FOURTH EXAMPLE

A fourth example was similar to the first example except that an anti-scattering film was not formed.

FIFTH EXAMPLE

A fifth example was similar to the first example except that sealing material was made of epoxy thermosetting resin having a refractive index of 1.41.

Figure 6:
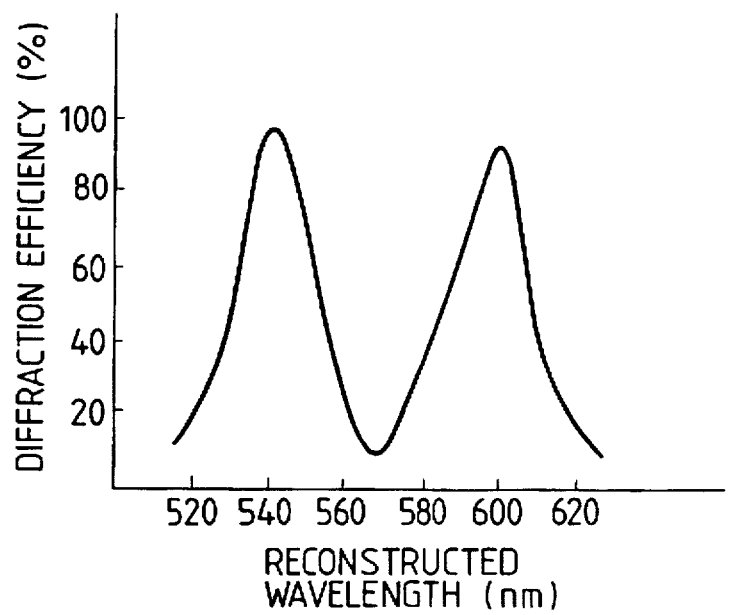
FIG. 6 is a diagram showing the relation between the diffraction efficiency and the reconstructed light wavelength in holograms in embodiments of this invention.

Noise measurement experiments were done on the previously-mentioned first, second, third, fourth, and fifth examples of holograms used in the head-up display of FIG. 3. Specifically, for each of the first, second, third, fourth, and fifth examples of holograms, the brightness of a noise image (spurious image) was measured under conditions where the brightness of a normal image was equal to 3,000 cd/m² and an indication distance was equal to 1.9 m. Regarding each of the first, second, third, fourth, and fifth examples of holograms, the noise ratio NR was calculated by referring to the following equation.

$$NR=(P/Q)\times 100\%$$

where P denoted the brightness of a noise image, and Q denoted the brightness of a normal image. The maximal value of the measured brightnesses which were obtained at points outside the normal image was used as the brightness of the noise image. During the experiments, the diffraction-wavelength characteristics of the holograms were given as illustrated in FIG. 6. As shown in FIG. 6, the diffraction efficiency was peaked at a reconstructed light wavelength of 540 nm and also at a reconstructed light wavelength of 600 nm.

Figure 7:
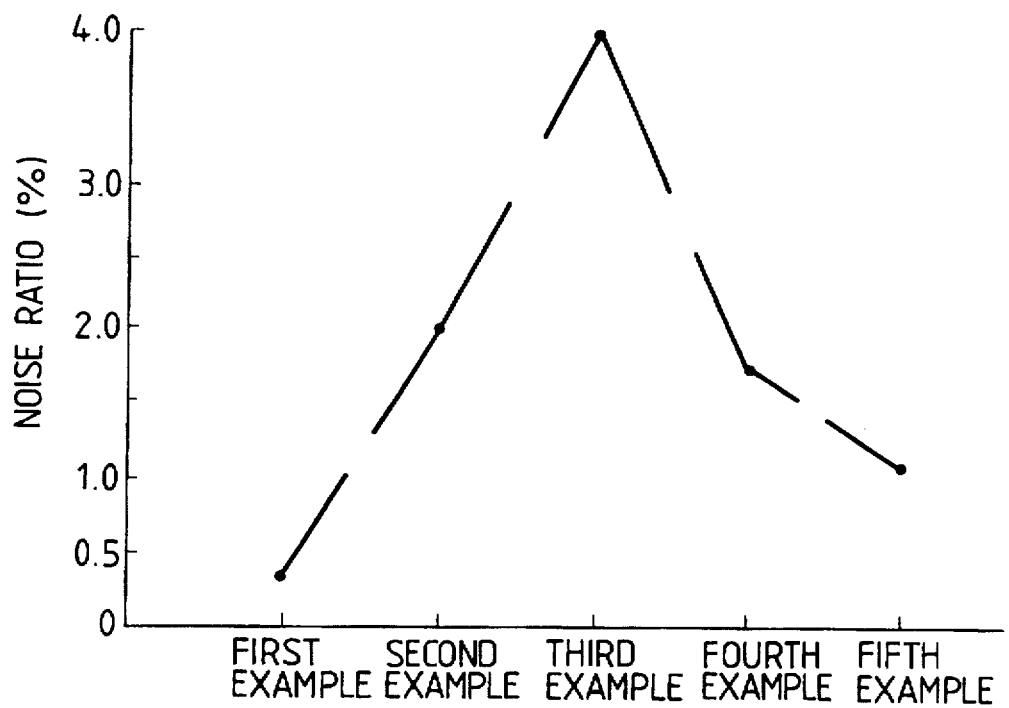
FIG. 7 is a diagram showing the noise ratios of examples of holograms in embodiments of this invention.

FIG. 7 shows the calculated noise ratios of the first, second, third, fourth, and fifth examples of holograms which were obtained at a reconstructed light wavelength of 540 nm. As shown in FIG. 7, the first example of the hologram had the smallest noise ratio. In addition, an image indicated via the first example of the hologram was adequately clear. Setting the sealing layer width "W" to 5 mm ensured that the predetermined pattern on the hologram element did not disappear even after the hologram element remained in atmosphere having a temperature of 65° C. and a relative humidity (RH) of 95% for 1,000 hours.

DESCRIPTION OF A SECOND GROUP OF THE PREFERRED EMBODIMENTS

According to an embodiment of this invention, a hologram element comprises an optically transparent base plate having first and second opposite surfaces; a film of a diffraction grating which is provided on the first surface of the base plate; and means provided on the second surface of the base plate for preventing reflection of light; wherein the means comprises one of a film including $SiO_2$ particles and a film of $MgF_2$.

It is preferable that the $SiO_2$ particles have diameters of 10–150 nm. It is also preferable that the diffraction grating film comprises one of a gelatine film, a photopolymer film, and a photoresist film. The base plate comprises, for example, a flexible resin film.

It is preferable that the flexible resin film is made of a material selected from the group consisting of amorphous polyolefine, polycarbonate (PC), polymethyl methacrylate (PMMA), and perfluoroalkoxypolyethylene (PFA).

The hologram element can be attached to a vehicle windshield when being used.

According to an embodiment of this invention, a hologram display comprises a cover plate; and a hologram element provided on the cover plate and having a side subjected to incident light; wherein the hologram element comprises a flexible resin film, a film of a diffraction grating which is provided on the flexible resin film, and means provided at the side of the hologram element for preventing reflection of light, the means comprising one of a film including $SiO_2$ particles and a film of $MgF_2$.

It is preferable that the diffraction grating film comprises one of a gelatine film, a photopolymer film, and a photoresist film. It is also preferable that the flexible resin film is made of a material selected from the group consisting of amorphous polyolefine, polycarbonate (PC), polymethyl methacrylate (PMMA), and perfluoroalkoxypolyethylene (PFA).

The $SiO_2$ particles have diameters of, for example, 10–150 nm. The hologram element may be sandwiched between two cover plates. Edges of the cover plate and the flexible resin film may be bonded together by ultrasonic welding.

According to an embodiment of this invention, a hologram element comprises an optically transparent base plate having first and second opposite surfaces; a film of a diffraction grating which is provided on the first surface of the base plate; an optically transparent member having first and second opposite surfaces, wherein the first surface of the member faces the diffraction grating film; and means provided on the second surface of the base plate for preventing reflection of light; wherein the means comprises one of a film including $SiO_2$ particles and a film of $MgF_2$, and the $SiO_2$ particles have diameters of 10–150 nm, and wherein at least one of the base plate and the member comprises a flexible resin film.

Figure 12:
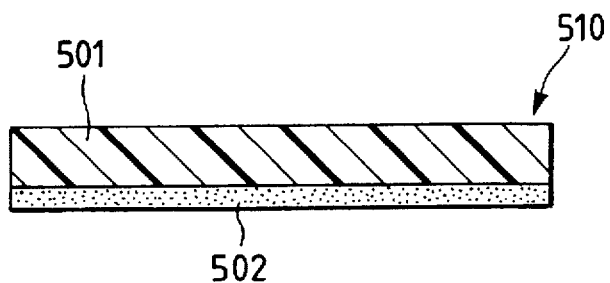
FIG. 12 is a sectional view of a hologram according to an embodiment of this invention.

Specific embodiments of this invention will now be described. With reference to FIG. 12, a hologram 510 includes a laminate of films 501 and 502. The film 501 is made of transparent flexible resin. The film 502 is made of gelatine. The gelatine film 502 has a predetermined holographic pattern corresponding to interference fringes. In other words, the gelatine film 502 forms a diffraction grating of a predetermined pattern. A surface of the gelatine film 502 is covered with the flexible resin film 501. Generally, the flexible resin film 501 serves as a base plate for supporting the gelatine film 502.

The flexible resin forming the film 501 includes, for example, amorphous polyolefine. It is preferable that the flexible resin film 501 has a predetermined uniform thickness of 50 µm to 1.0 mm. The flexible resin film 501 has a refractive index of 1.51 which is close to that of the gelatine film 502. This design is advantageous in reducing noise caused by scattering at the boundary (interface) between the films 501 and 502 during image reproduction or other processes.

The gelatine film 502 includes a diffraction grating film on which a predetermined pattern of interference fringes has been recorded. It is preferable that the gelatine film 502 has a predetermined uniform thickness of 10 µm to 40 µm.

Figure 13:
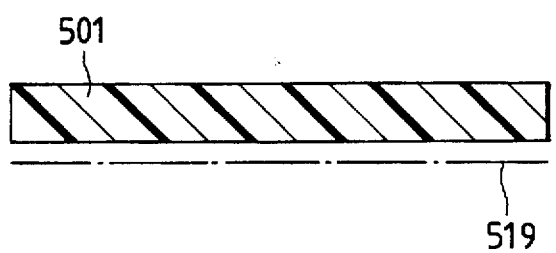
FIG. 13 is a sectional view of a flexible resin film in a state which occurs during the fabrication of the hologram of FIG. 12.

The hologram 510 of FIG. 12 was fabricated as follows. First, as shown in FIG. 13, a flexible resin film 501 was prepared. A hydrophilic film 519 was formed on a surface of the flexible resin film 501 to prevent a gelatine solution from being repelled. It was preferable that the hydrophilic film 519 included a film of styrene-butadiene rubber which had a great hydrophilicity and a refractive index close to that of a glass. In this case, styrene-butadiene rubber was applied to the surface of the flexible resin film 501, and was made into a film thereon.

Subsequently, a gelatin solution was adjusted and prepared by adding ammonium dichromate and gelatine to water which was a solvent. The weight ratio among used amounts of ammonium dichromate, gelatine, and water were such that the weight of the used amount of gelatine was 2–20% relative to water, and the weight of the used amount of ammonium dichromate was 2–15% relative to gelatine. The gelatine solution was applied to the surface of the flexible resin film 501 which was coated with the hydrophilic film 519. In other words, the gelatine solution was applied to the surface of the flexible resin film 501 via the hydrophilic film 519.

Figure 14:
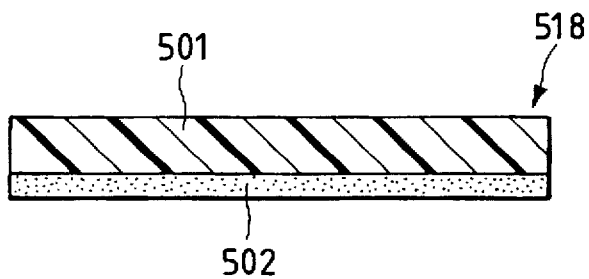
FIG. 14 is a sectional view of a hologram dry plate which appears during the fabrication of the hologram of FIG. 12.

Then, the gelatine solution with the flexible resin film 501 was dried for 15–80 hours while being held in atmosphere having a temperature of 20° C. and a relative humidity (RH) of 50%. Consequently, as shown in FIG. 14, the gelatine solution gelled into a gelatine film 502 extending on the surface of the flexible resin film 501, and a hologram dry plate 518 was formed which had a laminate of the flexible resin film 501 and the gelatine film 502.

Figure 15:
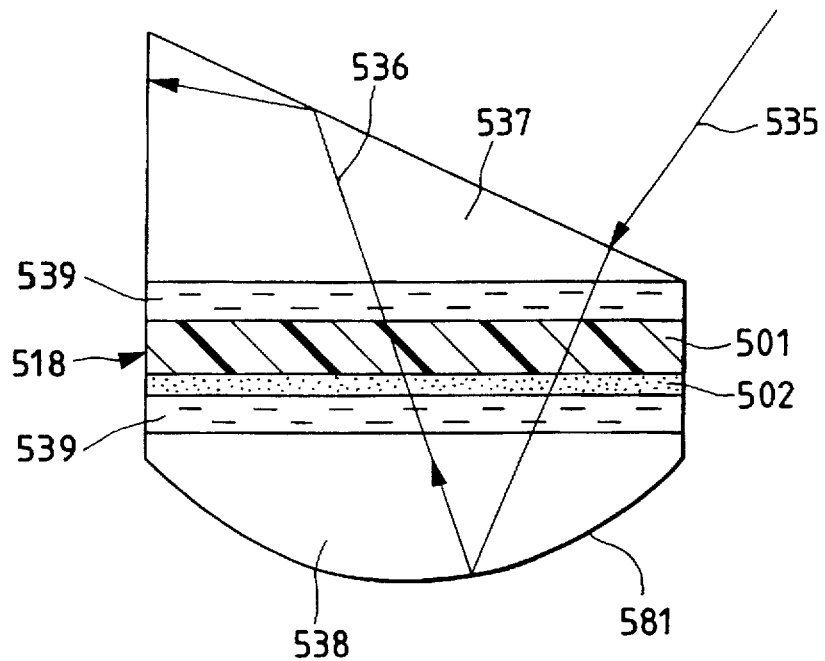
FIG. 15 is a sectional view of an optical arrangement used in the fabrication of the hologram of FIG. 12.

As shown in FIG. 15, refractive index matching liquid 539 was applied to opposite surfaces of the hologram dry plate 518. Then, the hologram dry plate 518 was placed between a prism 537 and a convex lens 538. The flexible resin film 501 faced the prism 537 while the gelatine film 502 faced the convex lens 538. There was a layer of the refractive index adjusting liquid 539 between the flexible resin film 501 and the prism 537. In addition, there was a layer of the refractive index adjusting liquid 539 between the gelatine film 502 and the convex lens 538. The convex lens 538 was previously provided with a reflecting film 581 extending on a surface remote from the gelatine film 502. The refractive index adjusting liquid 539 used, for example, silicone oil having a refractive index of 1.48–1.55.

In this way, the prism 537, the convex lens 538, the hologram dry plate 518, and the layers of the refractive index adjusting liquid 539 were combined into an optical arrangement of FIG. 15. The optical arrangement had an approximately uniform refractive index.

A laser light beam 535 having a predetermined wavelength was applied to the optical arrangement of FIG. 15 at a first predetermined incident angle. Specifically, the laser light beam 535 was applied to the prism 537 at the first predetermined incident angle. The laser light beam 535 entered the prism 537, and then traveled in the optical arrangement along a substantially straight path since the optical arrangement had an approximately uniform refractive index. In more detail, the laser light beam 535 sequentially passed through the prism 537, the layer of the refractive index adjusting liquid 539, the hologram dry plate 518, and the layer of the refractive index adjusting liquid 539 as a forward light beam. Then, the laser light beam 535 entered the convex lens 538 and traveled therein before reaching the reflecting film 581. The laser light beam 535 was reflected at the reflecting film 581, and then traveled back through the convex lens 538, the layer of the refractive index adjusting liquid 539, the hologram dry plate 518, and the layer of the refractive index adjusting liquid 539 as a reflected light beam. The reflected light beam and the forward light beam interfered with each other, forming first interference fringes which were recorded on the gelatine film 502. The first interference fringes corresponded to a first holographic pattern.

Subsequently, the laser light beam 535 was applied to the optical arrangement of FIG. 15 at a second predetermined incident angle different from the first predetermined incident angle, and pattern recording on the gelatine film 502 was similarly executed. In this case, second interference fringes different from the first interference fringes were recorded on the gelatine film 502. The second interference fringes corresponded to a second holographic pattern different from the first holographic pattern. Thus, two different holographic patterns, that is, interference fringes of two different colors, were recorded on the gelatine film 502. This design means that reconstructed light beams of two different colors or wavelengths can be generated during practical use of a resultant hologram.

Next, the hologram dry plate 518 was sequentially passed through baths or vessels filled with ethanol so that the refractive index adjusting liquid 539 was washed away therefrom. The number of the ethanol baths was preferably equal to one, two, or three. Then, the hologram dry plate 518 was treated in a constant-temperature water bath maintained at 20° C. As a result, chromium was removed from the gelatine film 502, and the gelatine film 502 was swelled. Subsequently, the gelatin film 502 (the hologram dry plate 518) was dipped in commercially-available photography hardening fixer (for example, "Rapid Fixer" produced by Eastman Kodak Company) for about 10 minutes. Thus, the gelatine film 502 hardened. To prevent the occurrence of local hardening due to bubbles, it was preferable to add 0.2–5.0% surface active agent to the photography hardening fixer by weight. An example of the surface active agent was dry well.

Subsequently, the gelatine film 502 (the hologram dry plate 518) was washed in water so that the photography hardening fixer, the surface active agent, and others were removed therefrom. Then, the gelatine film 502 (the hologram dry plate 518) was dehydrated at a high speed by isopropanol or isopropyl alcohol (IPA). Specifically, the hologram dry plate 518 was sequentially passed through baths or vessels filled with IPA aqueous solutions which had IPA concentrations increasing in that order. The IPA concentration of the solution in the final bath was equal to 100%. The number of the IPA baths was preferably equal to two, three, or four. Then, the hologram dry plate 518 was subjected to a thermally ageing process to prevent changes in reconstructed light wavelengths during practical use of a resultant hologram. Specifically, the hologram dry plate 518 was heated at 150 ° C. for 4 hours. As a result, the hologram dry plate 518 was made into a hologram 510 of FIG. 12.

The hologram 510 of FIG. 12 has the following advantages. Since the gelatine film 502 extends on the flexible resin film 501, the hologram 510 can be easily deformed. Accordingly, the hologram 510 can be actually used while being attached to a curved surface of a support or other members. Since the flexible resin film 501 is made of amorphous polyolefine, the hologram 510 can be waterproof or water-resistant. The flexible resin film 501 is light in weight. In addition, the flexible resin film 510 is resistant to shocks. Therefore, the flexible resin film 510 can be thinner than a corresponding glass plate for covering a gelatine film.

As previously described, the flexible resin film 501 is made of amorphous polyolefine. The flexible resin film 501 may be made of other material such as polycarbonate (PC), polymethyl methacrylate (PMMA), or perfluoroalkoxypolyethylene (PFA). Samples "1", "2", "3", and "4" of the flexible resin film 501 were formed from such different materials. Specifically, the sample "1" used amorphous polyolefine. The sample "2" used PC. The sample "3" used PMMA. The sample "4" used PFA.

Measurements were made as to characteristics of the samples "1", "2", "3", and "4". In more detail, the specific gravities were measured in a way according to "ASTM D792". The coefficients of water absorption were measured in a way according to "ASTM D570". The coefficients of moisture absorption were measured in a way according to "JIS 6911". The coefficients of moisture permeability were measured by a water vapor transmittance tester with a thickness of 1.2 mm. The light transmittances were measured while sample thicknesses were 3 mm and used light had a wavelength of 830 nm. The refractive indexes were measured in a way according to "ASTM D542". The coefficients of photoelasticity were measured by an ellipsometer using light with a wavelength of 663 nm. The glass-transition temperatures were measured in a way according to "DSC". The thermal deformation temperatures were measured in a way according to "ASTM D648" while the samples were subjected to a pressure of 18.6 gf/cm$^2$. The coefficients of thermal expansion were measured in a way according to "TMA". The MI values were measured at a temperature of 280° C. in a way according to "JIS K6719". The bending elastic moduli were measured in a way according to "ASTM D790". The bending strengths were measured in a way according to "ASTM D790". Regarding the sample "1" which used amorphous polyolefine, the results of the measurements were given as follows. The measured specific gravity was equal to 1.01. The measured coefficient of water absorption was smaller than 0.01%. The measured coefficient of moisture absorption was smaller than 0.01%. The measured coefficient of moisture permeability was smaller than 0.01 (g/m$^2$.24 h). The measured light transmittance was equal to 91%. The measured refractive index was equal to 1.53 ($n_d^{25}$). The measured coefficient of photoelasticity was equal to $6.3 \times 10^{-13}$ (cm$^2$/dyne). The measured glass-transition temperature was equal to 140°–141° C. The measured thermal deformation temperature was equal to 123°–124° C. The measured coefficient of thermal expansion was equal to $7.0 \times 10^{-5}$ (deg$^{-1}$). The measured MI value was equal to 5–15 (g/10 min). The measured bending elastic modulus was equal to 24,000–25,000 (kgf/cm$^2$). The measured bending strength was equal to 1,010–1,040 (kgf/cm$^2$).

Regarding the sample "2" which used PC, the results of the measurements were given as follows. The measured specific gravity was equal to 1.20. The measured coefficient of water absorption was equal to 0.201%. The measured coefficient of moisture absorption was equal to 0.24%. The measured coefficient of moisture permeability was equal to 1.53 (g/m$^2$.24 h). The measured light transmittance was equal to 90%. The measured refractive index was equal to 1.59 ($n_d^{25}$). The measured coefficient of photoelasticity was equal to 72×10$^{-13}$ (cm$^2$/dyne). The measured glass-transition temperature was equal to 140° C. The measured thermal deformation temperature was equal to 121° C. The measured coefficient of thermal expansion was equal to 7.0×10$^{-5}$ (deg$^{-1}$). The measured MI value was equal to 57 (g/10 min). The measured bending elastic modulus was equal to 24,000 (kgf/cm$^2$). The measured bending strength was equal to 930 (kgf/cm$^2$).

Regarding the sample "3" which used PMMA, the results of the measurements were given as follows. The measured specific gravity was equal to 1.19. The measured coefficient of water absorption was equal to 0.30%. The measured coefficient of moisture absorption was equal to 0.50%. The measured coefficient of moisture permeability was equal to 1.14 (g/m$^2$.24 h). The measured light transmittance was equal to 91%. The measured refractive index was equal to 1.49 ($n_d^{25}$). The measured coefficient of photoelasticity was equal to 6.3×10$^{-13}$ (cm$^2$/dyne). The measured glass-transition temperature was equal to 105° C. The measured thermal deformation temperature was equal to 90° C. The measured coefficient of thermal expansion was equal to 8.0×10$^{-5}$ (deg$^{-1}$). The measured MI value was unknown or unavailable. The measured bending elastic modulus was equal to 30,000 (kgf/cm$^2$). The measured bending strength was equal to 1,150 (kgf/cm$^2$).

Regarding the sample "4" which used PFA, the results of the measurements were given as follows. The measured specific gravity was equal to 2.15. The measured coefficient of water absorption was equal to 0.03%. The measured coefficient of moisture absorption was unknown or unavailable. The measured coefficient of moisture permeability was unknown or unavailable. The measured light transmittance was unknown or unavailable. The measured refractive index was unknown or unavailable. The measured coefficient of photoelasticity was unknown or unavailable. The measured melting point correspond to a glass-transition temperature was equal to 320°–310° C. The measured thermal deformation temperature was equal to 50° C. The measured coefficient of thermal expansion was equal to 12×10$^{-5}$ (deg$^{-1}$). The measured MI value was unknown or unavailable. The measured bending elastic modulus was equal to 6,600–7,000 (kgf/cm$^2$). The measured bending strength was unknown or unavailable since the sample did not break.

It was found from the results of the measurements that the sample "1" using amorphous polyolefine was most preferable among the samples "1", "2", "3", and "4" as a flexible resin film 501 for the reasons as follows. The coefficient of water absorption of the sample "1" was equal to a small value less than 0.01%. The refractive index of the sample "1" was close to that of the gelatine film 502. The thermal deformation temperature of the sample "1" was equal to 123°–124° C. which suited to a film-configuration hologram display element. The sample "1" was light in weight.

Figure 16:
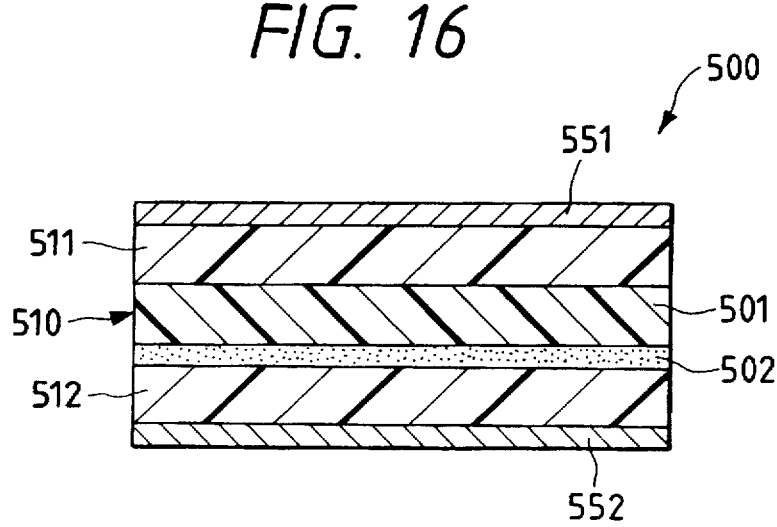
FIG. 16 is a sectional view of a hologram display element according to an embodiment of this invention.

FIG. 16 shows an embodiment of this invention which relates to a hologram display element 500 containing the hologram 510 of FIG. 12. As shown in FIG. 16, the hologram display element 500 includes cover plates 511 and 512 extending on opposite surfaces of the hologram 510 respectively. The cover plate 511 extends on the flexible resin film 501 of the hologram 510. The cover plate 512 extends on the gelatin film 502 of the hologram 510. A light receiving surface of the hologram display element 500, that is, a surface of the cover plate 511 which is remote from the hologram 510, is coated with a nonreflective film (an anti-reflection film) 551. The other surface of the hologram display element 500, that is, a surface of the cover plate 512 which is remote from the hologram 510, is coated with an anti-scattering film 552.

The nonreflective film 551 includes, for example, a film containing very fine SiO$_2$ grains (SiO$_2$ particles) having diameters 10–150 nm. The nonreflective film 551 may be a film made of MgF$_2$. The anti-scattering film 552 can be a black film. The cover plates 511 and 512 include flexible resin films made of, for example, amorphous polyolefine. The cover plates 511 and 512 have thicknesses of 0.1–1.0 mm.

Figure 17:
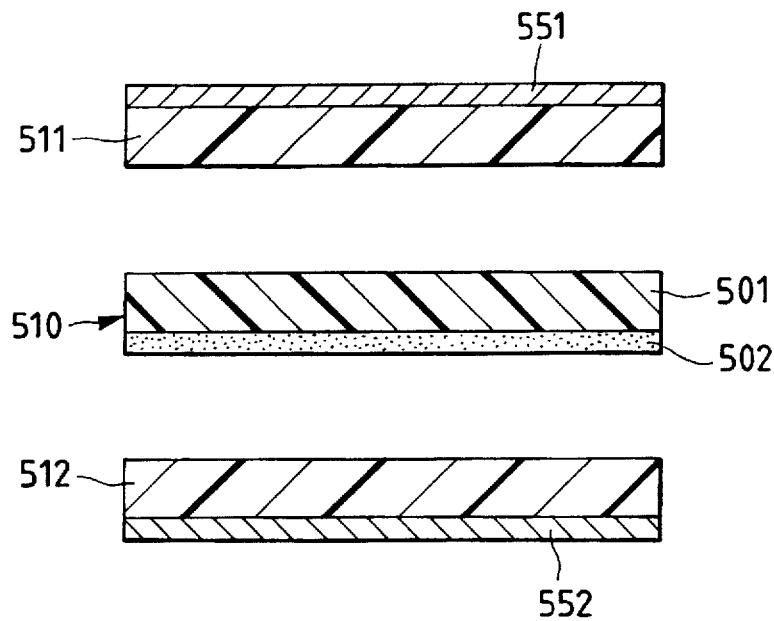
FIG. 17 is a sectional view of various films in states which occur during the fabrication of the hologram display element of FIG. 16.

The hologram display element 500 of FIG. 16 was fabricated as follows. First, as shown in FIG. 17, a hologram 510 was prepared. Also, cover plates 511 and 512 of shapes similar to that of the hologram 510 were prepared. A nonreflective film 551 was formed on one surface of the cover plate 511. The nonreflective film 551 was a film containing SiO$_2$ particles.

Before the nonreflective film 551 was formed on the cover plate 511, SiO$_2$ particles were dispersed in an alkoxide solution so that a particle solution (a solution containing particles) was made. The particle solution was applied to a surface of the flexible resin film (cover plate) 511 or the flexible resin film (cover plate) 511 was dipped in the particle solution so that a layer of the particle solution with a uniform thickness was provided on the surface of the flexible resin film (cover plate) 511. The particle solution layer on the flexible resin film (cover plate) 511 was dried, and was fired at a predetermined low temperature, for example, about 120° C. As a result, SiO$_2$ particles remained on the surface of the flexible resin film (cover plate) 511. The SiO$_2$ particles composed a firm and adequately-nonreflective film 551 attached to the surface of the flexible resin film (cover plate) 511.

According to these processes, it is possible to form a nonreflective film 551 with a reflectivity of 0.1% or less provided that film-making control is accurately performed. Such a low reflectivity enables a high-quality and noise-free hologram display element.

An anti-scattering film 552 was formed on one surface of the other cover plate 512. For example, a black tape was attached to the surface of the cover plate 512 as an anti-scattering film 552.

Subsequently, in a vacuum, the hologram 510 was placed between the cover plates 511 and 512. In this case, the cover plates 511 and 512 were directed so that the nonreflective film 551 and the anti-scattering film 552 faced outward. Next, in the vacuum, edges of the hologram 510 and the cover plates 511 and 512 were bonded together by ultrasonic welding. As a result, a hologram display element 500 of FIG. 16 was completed.

The hologram display element 500 of FIG. 16 has the following advantages. Since the gelatine film 502 extends on the flexible resin film 501, the hologram 510 can be easily deformed. The opposite surfaces of the hologram 510 are coated with the flexible cover plates 511 and 512 respectively. Accordingly, the whole of the hologram display element 500 can also be easily deformed. As previously described, during the fabrication of the hologram display element 500, the edges of the hologram 510 and the cover plates 511 and 512 are bonded together by ultrasonic welding. Thus, it is unnecessary to provide any sealing width "W", and the hologram display element 500 has a simple structure. Since the hologram display element 500 dispenses with any waterproof sealing material, the thickness thereof can be small. Furthermore, the hologram display element 500 can be light in weight.

Since the ultrasonic welding is executed in a vacuum, air is prevented from entering regions among the hologram 510 and the cover plates 511 and 512. Therefore, the gelatine film 502 can be completely sealed by the cover plate 512 while its exposure to air remains prevented. The sealing of the gelatine film 502 ensures its long-term use during which its holographic characteristics remain unchanged.

The nonreflective film 551 can be applied to a structure having a combination of bonded glass plates. In this case, the nonreflective film 551 is formed on a surface of one of the glass plates. The formation of the nonreflective film 551 may be executed after the glass plates are bonded.

Figure 18:
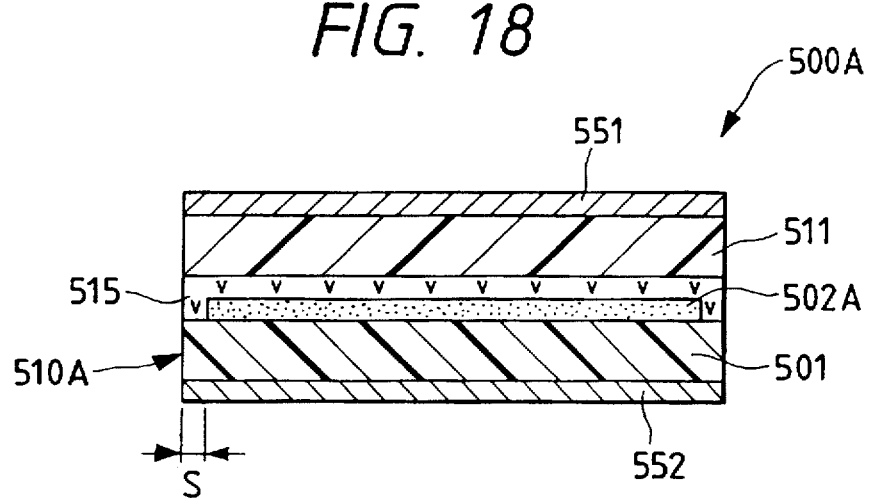
FIG. 18 is a sectional view of a hologram display element according to an embodiment of this invention.

FIG. 18 shows an embodiment of this invention which is similar to the embodiment of FIG. 16 except for design changes described hereinafter. In the embodiment of FIG. 18, a hologram display element 500A includes a hologram 510A which has a laminate of a flexible resin film 501 and a gelatine film 502A. The gelatine film 502A is smaller in size than the flexible resin film 501 so that a predetermined sealing width "S" is provided between the edges of the gelatine film 502A and the flexible resin film 501. During the fabrication of the hologram 510A, edges of an original gelatine film were removed to provide the sealing width "S".

In the embodiment of FIG. 18, a layer of transparent sealing material 515 which has a predetermined uniform thickness is provided between the gelatine film 502A and a cover plate 511. The sealing material 515 extends into and occupies an annular space having the sealing width "S" and lying outward of the edges of the gelatine film 502A. Accordingly, the gelatine film 502A is completely surrounded by the sealing material 515 and the flexible resin film 501. Thus, the gelatine film 502A is sealed.

A light receiving surface of the hologram display element 500A, that is, a surface of the cover plate 511 which is remote from the hologram 510A, is coated with a nonreflective film 551. The other surface of the hologram display element 500A, that is, a surface of the flexible resin film 501 which is remote from the gelatine film 502A, is coated with an anti-scattering film 552.

The sealing material 515 is water-resistant or waterproof. The sealing material 515 is preferably of the ultraviolet-setting type (hardening in response to ultraviolet rays) produced by Norland Company which does not require any heating process and which has a suitable refractive index. The sealing material 515 of this type enables a low reflecting noise level in the hologram display element 500A.

Figure 19:
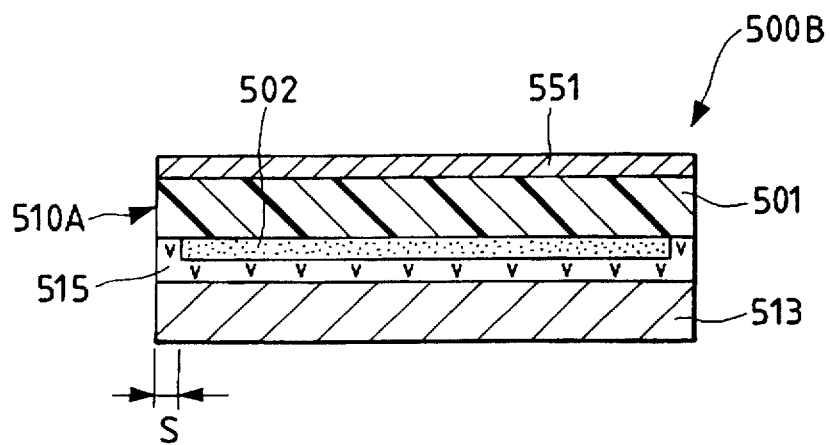
FIG. 19 is a sectional view of a hologram display element according to an embodiment of this invention.

FIG. 19 shows an embodiment of this invention which is similar to the embodiment of FIG. 18 except for design changes described hereinafter. The embodiment of FIG. 19 relates to a hologram display element 500B, in which a layer of transparent sealing material 515 is provided between a gelatine film 502A and a cover plate 513. The cover plate 513 is made of metal. A light receiving surface of the hologram display element 500B, that is, a surface of a flexible resin film 501 which is remote from the gelatine film 502A, is coated with a nonreflective film 551.

Figure 20:
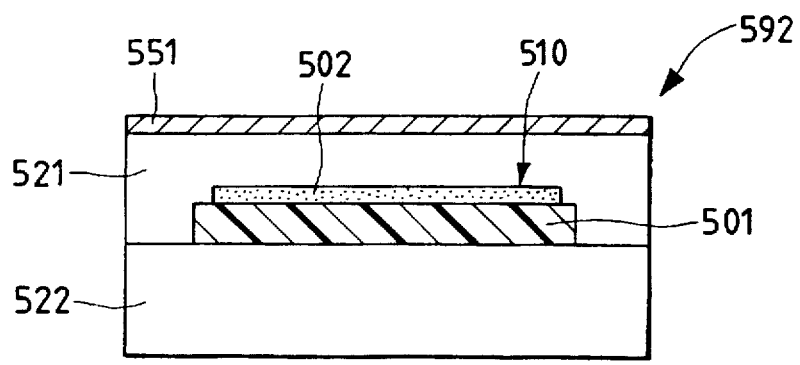
FIG. 20 is a sectional view of a portion of a head-up display according to an embodiment of this invention.
Figure 21:
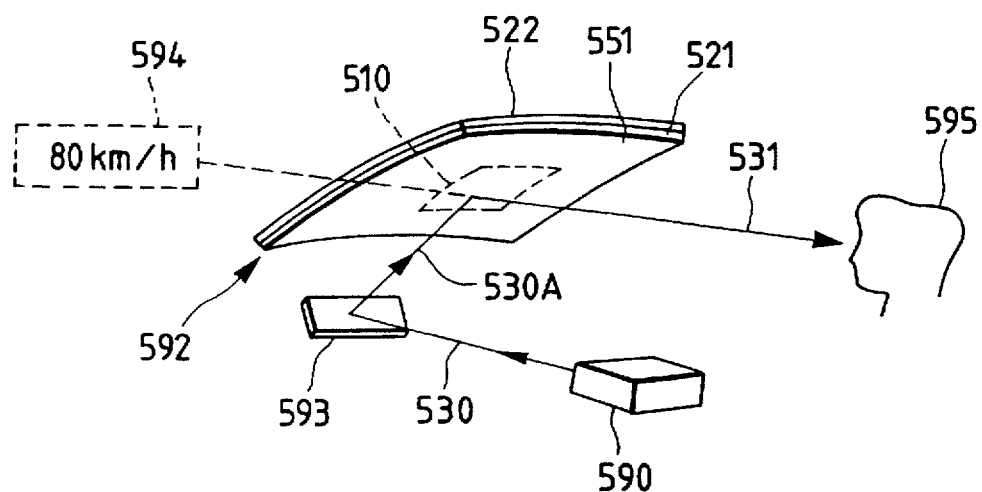
FIG. 21 is a perspective diagram of the head-up display in FIG. 20.

FIGS. 20 and 21 show an embodiment of this invention in which a hologram 510 of FIG. 12 is embedded and sealed in a vehicle windshield 592. As shown in FIG. 20, the windshield 592 has an inner glass plate 521 and an outer glass plate 522 which are bonded together by adhesive. The hologram 510 is located between the inner glass plate 521 and the outer glass plate 522. A light receiving surface of the inner glass plate 521, that is, a surface remote from the hologram 510, is coated with a nonreflective film 551.

Generally, the nonreflective film 551 is provided on the inner glass plate 521 by a dipping process after the inner glass plate 521 and the outer glass plate 522 are bonded together. The nonreflective film 551 may be provided on the inner glass plate 521 before the inner glass plate 521 and the outer glass plate 522 are bonded together. The nonreflective film 551 may be attached to the inner glass plate 521 by water-resistant sealing material which is preferably of the ultraviolet-setting type produced by Norland Company.

As shown in FIG. 21, the hologram 510 in the windshield 592 is used in a head-up display for an automotive vehicle. An indicator 590 having a light source, a mirror 593, and the windshield 592 with the hologram 510 compose the head-up display. The head-up display operates as follows. The indicator 590 emits a light beam 530 representing indicated information such as vehicle speed information. The light beam 530 emitted from the indicator 590 reaches the mirror 593, being reflected by the mirror 593 and then traveling from the mirror 593 toward the hologram 510 as a light beam 530A. The light beam 530A encounters the hologram 510, being diffracted and converted into a reconstructed light beam 531 thereby. The reconstructed light beam 531 exits from the hologram 510, and then travels toward eyes of a vehicle driver 595. Thus, a virtual image 594 of the indicated information (for example, the vehicle speed information) is projected into the driver's field of view as the driver 595 looks through the windshield 592.

As previously described, the hologram 510 is flexible. Therefore, the hologram 510 can be easily provided in a curved windshield.

Figure 22:
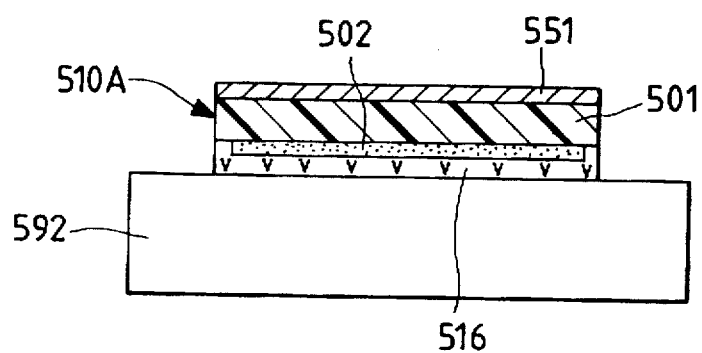
FIG. 22 is a sectional view of a hologram and a vehicle windshield according to an embodiment of this invention.

FIG. 22 shows an embodiment of this invention in which a hologram 510A is attached to a vehicle windshield 592 by transparent sealing material 516. The hologram 510A has a laminate of a flexible resin film 501 and a gelatine film 502A. The gelatine film 502A is smaller in size than the flexible resin film 501 so that a predetermined sealing width is provided between the edges of the gelatine film 502A and the flexible resin film 501.

As shown in FIG. 22, a layer of the sealing material 516 which has a predetermined uniform thickness is provided between the gelatine film 502A and the windshield 592. The sealing material 516 extends into and occupies an annular space having the sealing width and lying outward of the edges of the gelatine film 502A. Accordingly, the gelatine film 502A is completely surrounded by the sealing material 516 and the flexible resin film 501. Thus, the gelatine film 502A is sealed. A light receiving surface of the hologram 510A, that is, a surface of the flexible resin film 501 which is remote from the gelatine film 502A, is coated with a nonreflective film 551.

The sealing material 516 is water-resistant or waterproof. The sealing material 516 is preferably of the ultraviolet-setting type (hardening in response to ultraviolet rays) produced by Norland Company which does not require any heating process and which has a suitable refractive index.

The hologram 510A on the windshield 592 can be used in a head-up display similarly to the embodiment of FIGS. 20 and 21. The formation of the nonreflective film 551 on the flexible resin film 501 uses, for example, a dipping process. The hologram 510A is attached to the windshield 592 by the sealing material 516 after the formation of the windshield 592. This design is advantageous in preventing the hologram 510A from being subjected to a heating process during a later stage.

The hologram 510A in the embodiment of FIG. 22 can be applied to other systems such as a three-dimensional television system, a three-dimensional movie system, and a heat reflecting hologram system.

What is claimed is:

1. A method of fabricating a hologram element, comprising the steps of:

preparing an optically transparent base plate having first and second opposite surfaces;

forming a film having a diffraction grating on the first surface of the base plate;

preparing a solution containing $SiO_2$ particles; and dipping the second surface of the base plate in the solution to provide an antireflection film including $SiO_2$ particles on the second surface of the base plate after the film having the diffraction grating is formed.

2. A method of fabricating a hologram element, comprising the steps of:

preparing an optically transparent base plate having first and second opposite surfaces;

forming a film having a diffraction grating on the first surface of the base plate using a light exposure process; and performing a dipping process to provide a film on the second surface of the base plate for preventing reflection of light after the film having the diffraction grating is formed, wherein the film includes $SiO_2$ particles having diameters of 10–150 nm.

3. The method according to claim 2, wherein the step of forming the diffraction grating film includes using a lens in the light exposure process.

4. The method according to claim 2, wherein the diffraction grating film comprises one of a gelatine film, a photopolymer film, and a photoresist film.

5. The method according to claim 2, wherein the base plate comprises a flexible resin film.

6. The method according to claim 5, wherein the flexible resin film is made of a material selected from the group consisting of amorphous polyolefine, polycarbonate (PC), polymethyl methacrylate (PMMA), and perfluoroalkoxy-polyethylene (PFA).

7. A method of fabricating a hologram display, comprising the steps of:

preparing a cover plate;

forming a hologram element on the cover plate, the hologram element having a side subjected to incident light;

preparing a solution containing $SiO_2$ particles; and dipping the side of the hologram element in the solution to provide an antireflection film including $SiO_2$ particles at the side of the hologram element after the hologram element is formed.

8. A method of fabricating a hologram display, comprising the steps of:

preparing a cover plate;

forming a hologram element on the cover plate using a light exposure process, the hologram element having a first side that is subjected to incident light; and providing a film on the first-side of the hologram element using a dipping process after the hologram element is formed, the film being provided to prevent reflection of light and the film including $SiO_2$ particles having diameters of 10–150 nm, wherein the hologram element comprises a flexible resin film and a second film having a diffraction grating, the second film being provided on the flexible resin film.

9. The method according to claim 8, wherein the step of forming the hologram element includes using a lens in the light exposure process.

10. The method according to claim 8, wherein the diffraction grating film comprises one of a gelatine film, a photopolymer film, and a photoresist film.

11. The method according to claim 8, wherein the flexible resin film is made of a material selected from a group consisting of amorphous polyolefine, polycarbonate (PC), polymethyl methacrylate (PMMA), and perfluoroalkoxy-polyethylene (PFA).

12. The method according to claim 8, wherein the hologram element is sandwiched between two cover plates.

13. The method according to claim 8, wherein edges of the cover plate and the flexible resin film are bonded together by ultrasonic welding.

14. A method of fabricating a hologram element, comprising the steps of:

preparing an optically transparent base plate having first and second opposite surfaces;

forming a film having a diffraction grating on the first surface of the base plate;

preparing an optically transparent member having first and second opposite surfaces, wherein the first surface of the member faces the diffraction grating film;

preparing a solution containing $SiO_2$ particles; and dipping the second surface of the base plate in the solution to provide an antireflection film including $SiO_2$ particles on the second surface of the base plate after the film having the diffraction grating is formed.

15. A method of fabricating a hologram element, comprising the steps of:

preparing an optically transparent base plate having first and second opposite surfaces;

forming a film having a diffraction grating on the first surface of the base plate using a light exposure process;

preparing an optically transparent member having first and second opposite surfaces, the first surface of the member facing the diffraction grating film; and performing a dipping process to provide a film on the second surface of the base plate for preventing reflection of light after the film having the diffraction grating is formed, wherein the film includes $SiO_2$ particles having diameters of 10–50 nm, and wherein at least one of the base plate and the optically transparent member comprises a flexible resin film.

16. The method according to claim 15, wherein the step of forming the diffraction grating film includes using a lens in the light exposure process.

17. A method of fabricating a hologram element, comprising the steps of:

preparing an optically transparent base plate having first and second opposite surfaces;

forming a film having a diffraction grating on the first surface of the base plate using a light exposure process; and performing a dipping process to provide a film on the second surface of the base plate for preventing reflection of light after the film having the diffraction grating is formed, wherein the film includes $MgF_2$ particles.

18. The method according to claim 17, wherein the step of forming the diffraction grating film includes using a lens in the light exposure process.

19. The method according to claim 17, wherein the diffraction grating film comprises one of a gelatine film, a photopolymer film, and a photoresist film.

20. A method of fabricating a hologram element, comprising the steps of:

preparing an optically transparent base plate having first and second opposite surfaces, wherein the base plate comprises a flexible resin film;

forming a film having a diffraction grating on the first surface of the base plate using a light exposure process; and performing a dipping process to provide a film on the second surface of the base plate for preventing reflection of light after the film having the diffraction grating is formed, wherein the film includes $MgF_2$ particles.

21. The method according to claim 20, wherein the flexible resin film is made of a material selected from the group consisting of amorphous polyolefine, polycarbonate (PC), polymethyl methacrylate (PMMA), and perfluoroalkoxypolyethylene (PFA).

22. A method of fabricating a hologram display, comprising the steps of:

preparing a cover plate;

forming a hologram element on the cover plate using a light exposure process, the hologram element having a first side that is subjected to incident light; and providing a film on the first side of the hologram element using a dipping process after the hologram element is formed, the film being provided to prevent reflection of light and the film including $MgF_2$ particles, wherein the hologram element comprises a flexible resin film and a second film having a diffraction grating, the second film being provided on the flexible resin film.

23. The method according to claim 22, wherein the step of forming the hologram element includes using a lens in the light exposure process.

24. The method according to claim 22, wherein the diffraction grating film comprises one of a gelatine film, a photopolymer film, and a photoresist film.

25. The method according to claim 22, wherein the flexible resin film is made of a material selected from the group consisting of amorphous polyolefine, polycarbonate (PC), polymethyl methacrylate (PMMA), and perfluoroalkoxypolyethylene (PFA).

26. The method according to claim 22, wherein the hologram element is sandwiched between two cover plates.

27. The method according to claim 22, wherein edges of the cover plate and the flexible resin film are bonded together by ultrasonic welding.

28. A method of fabricating a hologram element, comprising the steps of:

preparing an optically transparent base plate having first and second opposite surfaces;

forming a film having a diffraction grating on the first surface of the base plate using a light exposure process;

preparing an optically transparent member having first and second opposite surfaces, the first surface of the member facing the diffraction grating film; and performing a dipping process to provide a film on the second surface of the base plate for preventing reflection of light after the film having the diffraction grating is formed, wherein the film includes $MgF_2$ particles, and at least one of the base plate and the optically transparent member comprises a flexible resin film.

29. The method according to claim 28, wherein the step of forming the diffraction grating film includes using a lens in the light exposure process.

30. A hologram device comprising:

a hologram member including a film and a hologram element, the film being fabricated from at least a flexible resin, the hologram element being positioned on the film and having a diffraction grating;

first and second cover plates being positioned on opposing sides of the hologram member, the hologram member and the first and second cover plates being bonded together by a welding process using an ultrasonic wave, at least one of the first and second cover plates having a light incident surface; and an anti-reflection layer positioned on the light incidence surface of one of the first and second cover plates, the anti-scattering layer including at least one of $SiO_2$ particles having diameters ranging from 10-150 nm and $MgF_2$ particles.

31. The hologram device of claim 30, wherein edges of the hologram member are bonded together with the first and second cover plates by a welding process using an ultrasonic wave.

32. The hologram device of claim 30, wherein the flexible resin comprises a resin selected from a group consisting of amorphous polyolefin, polycarbonate (PC), polymethyl methacrylate (PMMA), and perfluoroalkoxypolyethylene (PFA).

33. The hologram device of claim 30, wherein the first and second cover plates hold the hologram therebetween.

34. A method of fabricating a hologram device, comprising the steps of:

forming a hologram element on a film by applying light to the film, the film being fabricated from at least a flexible resin, the hologram element having a diffraction pattern;

forming an anti-reflection layer on at least one surface of a first cover plate using a dipping process, the anti-scattering layer including at least one of $SiO_2$ particles having diameters ranging from 10-150 nm and $MgF_2$ particles;

placing the hologram element between the first cover plate and a second cover plate; and bonding the hologram element together with the first and second cover plates by a welding process using an ultrasonic wave.

35. The method of claim 34, wherein the bonding step comprises bonding edges of the hologram element together with the first and second cover plates by a welding process using an ultrasonic wave.

36. The method of claim 34, wherein the flexible resin comprises a resin selected from a group consisting of amorphous polyolefine, polycarbonate (PC), polymethyl methacrylate (PMMA), and perfluoroalkoxy-polyethylene (PFA).

37. The method of claim 34, wherein the bonding step comprises bonding edges of the hologram element together with the first and second cover plates by a welding process using an ultrasonic wave.

38. The method of claim 34, wherein the flexible resin comprises a resin selected from a group consisting of amorphous polyolefine, polycarbonate (PC), polymethyl methacrylate (PMMA), and perfluoroalkoxy-polyethylene (PFA).

39. A method of fabricating a hologram element, comprising the steps of:
preparing an optically transparent base plate having first and second opposite surfaces;
forming a film having a diffraction grating on the first surface of the base plate;
preparing a solution containing particles; and
dipping the second surface of the base plate in the solution to provide an antireflection film including particles on the second surface of the base plate after the film having the diffraction grating is formed.

40. A method as recited in claim 39, where the particles are at least one of $SiO_2$ particles and $MgF_2$ particles.

41. A method of fabricating a hologram element, comprising the steps of:
preparing an optically transparent base plate having first and second opposite surfaces;
forming a film having a diffraction grating on the first surface of the base plate using a light exposure process; and
performing a dipping process to provide a film on the second surface of the base plate for preventing reflection of light after the film having the diffraction grating is formed,
wherein the film includes particles having diameters of 10–150 nm.

42. The method according to claim 41, wherein the diffraction grating film comprises one of a gelatin film, a photopolymer film, and a photoresist film.

43. The method according to claim 41, wherein the base plate comprises a flexible resin film.

44. The method according to claim 43, wherein the flexible resin film is made of a material selected from the group consisting of amorphous polyolefine, polycarbonate (PC), polymethyl methacrylate (PMMA), and perfluoroalkoxypolyethylene (PFA).

45. The method according to claim 41, wherein the flexible resin film is made of a material selected from the group consisting of amorphous polyolefine, polycarbonate (PC), polymethyl methacrylate (PMMA), and perfluoroalkoxypolyethylene (PFA).

46. A method as recited in claim 41, wherein the particles are at least one of $SiO_2$ particles and $MgF_2$ particles.

47. A method of fabricating a hologram display, comprising the steps of:
preparing a cover plate;
forming a hologram element on the cover plate, the hologram element having a side subjected to incident light;
preparing a solution containing particles; and
dipping the side of the hologram element in the solution to provide an antireflection film including particles at the side of the hologram element after the hologram element is formed.

48. A method as recited in claim 47, wherein the particles are at least one of $SiO_2$ particles and $MgF_2$ particles.

49. A method of fabricating a hologram display, comprising the steps of:
preparing a cover plate;
forming a hologram element on the cover plate using a light exposure process, the hologram element having a first side that is subjected to incident light; and
providing a film on the first side of the hologram element using a dipping process after the hologram element is formed, the film being provided to prevent reflection of light and the film including particles having diameters of 10–150 nm,
wherein the hologram element comprises a flexible resin film and a second film having a diffraction grating, the second film being provided on the flexible resin film.

50. The method according to claim 49, wherein the step of forming the hologram element includes using a lens in the light exposure process.

51. The method according to claim 49, wherein the diffraction grating film comprises one of a gelatin film, a photopolymer film, and a photoresist film.

52. The method according to claim 49, wherein the flexible resin film is made of a material selected from a group consisting of amorphous polyolefine, polycarbonate (PC), polymethyl methacrylate (PMMA), and perfluoroalkoxypolyethylene (PFA).

53. The method according to claim 49, wherein the hologram element is sandwiched between two cover plates.

54. The method according to claim 49, wherein edges of the cover plate and the flexible resin film are bonded together by ultrasonic welding.

55. A method as recited in claim 49, wherein the particles are at least one of $SiO_2$ particles and $MgF_2$ particles.

56. A method of fabricating a hologram element, comprising the steps of:
preparing an optically transparent base plate having first and second opposite surfaces;
forming a film having a diffraction grating on the first surface of the base plate;
preparing an optically transparent member having first and second opposite surfaces, wherein the first surface of the member faces the diffraction grating film;
preparing a solution containing particles; and
dipping the second surface of the base plate in the solution to provide an antireflection film including particles on the second surface of the base plate after the film having the diffraction grating is formed.

57. A method as recited in claim 56, wherein the particles are at least one of $SiO_2$ particles and $MgF_2$ particles.

58. A method of fabricating a hologram element, comprising the steps of:
preparing an optically transparent base plate having first and second opposite surfaces;
forming a film having a diffraction grating on the first surface of the base plate using a light exposure process;
preparing an optically transparent member having first and second opposite surfaces, the first surface of the member facing the diffraction grating film; and
performing a dipping process to provide a film on the second surface of the base plate for preventing reflection of light after the film having the diffraction grating is formed,
wherein the film includes particles having diameters of 10–150 nm, and wherein at least one of the base plate and the optically transparent member comprises a flexible resin film.

59. The method according to claim 58, wherein the step of forming the diffraction grating film includes using a lens in the light exposure process.

60. A method as recited in claim 58, wherein the particles are at least one of $SiO_2$ particles and $MgF_2$ particles.

61. A hologram device comprising:

a hologram member including a film and a hologram element, the film being fabricated from at least a flexible resin, the hologram element being positioned on the film and having a diffraction grating;

first and second cover plates being positioned on opposing sides of the hologram member, the hologram member and the first and second cover plates being bonded together by a welding process using an ultrasonic wave, at least one of the first and second cover plates having a light incident surface; and an anti-reflection layer positioned on the light incidence surface of one of the first and second cover plates, the anti-scattering layer including particles.

62. The hologram device of claim 61, wherein edges of the hologram member are bonded together with the first and second cover plates by a welding process using an ultrasonic wave.

63. The hologram device of claim 61, wherein the flexible resin comprises a resin selected from a group consisting of amorphous polyolefin, polycarbonate (PC), polymethyl methacrylate (PMMA), and perfluoroalkoxypolyethylene (PFA).

64. The hologram device of claim 61, wherein the first and second cover plates hold the hologram therebetween.

65. The hologram device of claim 61, wherein the particles are at least one of $SiO_2$ particles having diameters ranging from 10–150 nm and $MgF_2$ particles.

66. A method of fabricating a hologram device, comprising the steps of:

forming a hologram element on a film by applying light to the film, the film being fabricated from at least a flexible resin, the hologram element having a diffraction pattern;

forming an anti-reflection layer on at least one surface of a first cover plate using a dipping process, the anti-scattering layer including particles;

placing the hologram element between the first cover plate and a second cover plate; and bonding the hologram element together with the first and second cover plates by a welding process using an ultrasonic wave.

67. The hologram device of claim 66, wherein the particles are at least one of $SiO_2$ particles having diameters ranging from 10–150 nm and $MgF_2$ particles.

* * * * *